Figure 1:
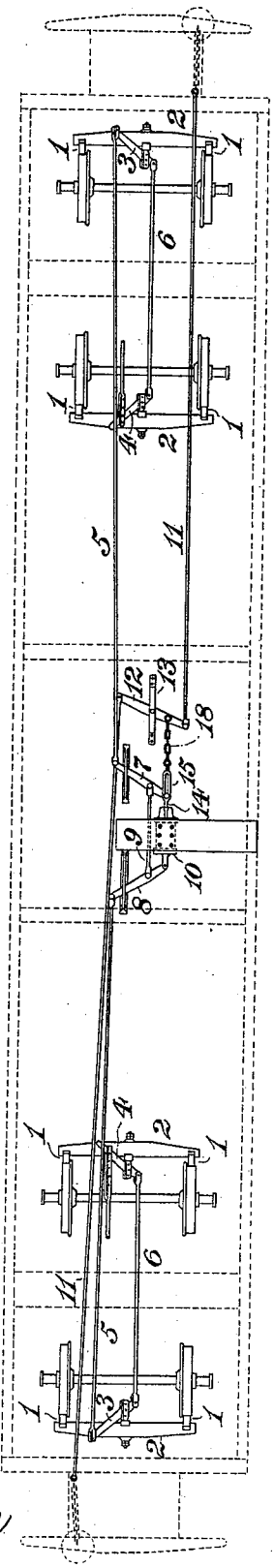

(No Model.)  H. J. SMALL.  3 Sheets—Sheet 1.
CAR BRAKE.

No. 510,200. Patented Dec. 5, 1893.

WITNESSES:
T. J. Hogan.
F. E. Gaither.

INVENTOR,
Henry J. Small
by J. Snowden Bell,
Att'y.

(No Model.) 3 Sheets—Sheet 2.

H. J. SMALL.
CAR BRAKE.

No. 510,200. Patented Dec. 5, 1893.

WITNESSES:
T. J. Hogan.
F. E. Gaither

INVENTOR,
Henry J. Small,
by J. Snowden Bell,
Att'y

THE NATIONAL LITHOGRAPHING COMPANY,
WASHINGTON, D. C.

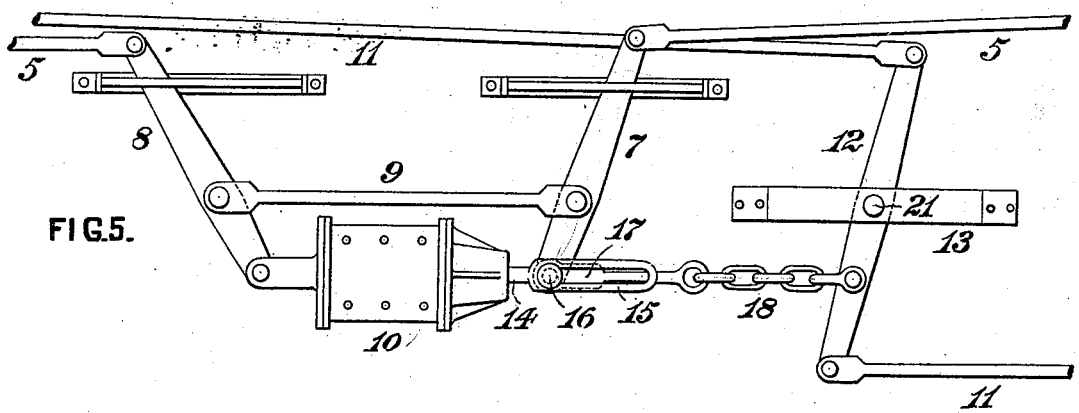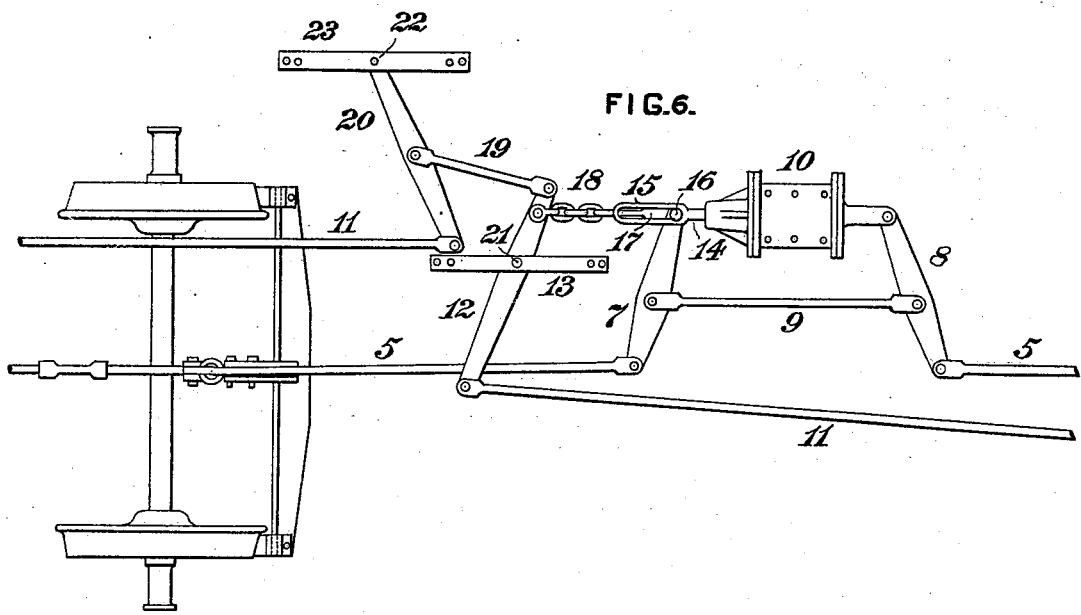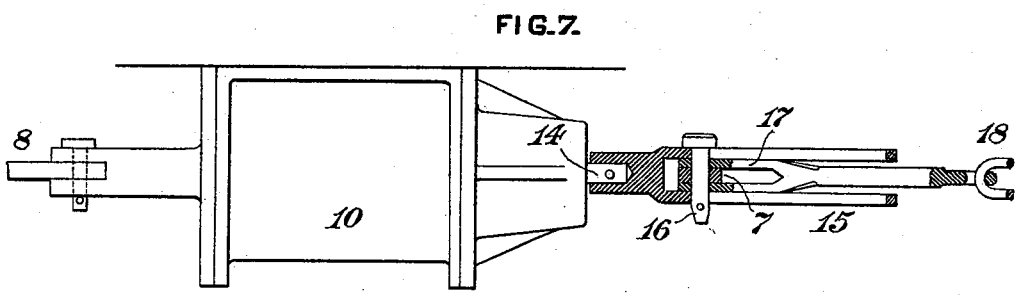

UNITED STATES PATENT OFFICE.

HENRY J. SMALL, OF SACRAMENTO, CALIFORNIA.

CAR-BRAKE.

SPECIFICATION forming part of Letters Patent No. 510,200, dated December 5, 1893.

Application filed October 10, 1893. Serial No. 487,759. (No model.)

*To all whom it may concern:*

Be it known that I, HENRY J. SMALL, of Sacramento, in the county of Sacramento and State of California, have invented a certain new and useful Improvement in Railroad-Car Brakes, of which improvement the following is a specification.

My invention relates more particularly to car brakes of the class or type ordinarily known as the "Hodge" system, and its object is to facilitate and perfect their operation, and afford increased security against accidents, especially in operating trains on long and heavy grades, by the provision of means whereby the brakes may be operated either by hand or by fluid pressure, both acting in the same direction in application and also in release, so as to be supplemental one to the other, and acting either independently or in unison as desired, instead of requiring, as heretofore, the release of the brakes when applied by one power, before their application can be effected by the other.

The improvement claimed is hereinafter fully set forth.

In brake systems of the Hodge class, provided with both air and hand actuating appliances, as ordinarily heretofore employed, such brake levers are provided, and their combination with the hand brake shafts and the pistons of the air brake cylinders is such, that the brakes cannot be set by both the air and the hand appliances at one and the same time, inasmuch as the brake shoes must be released from pressure due to one applying power before they can be applied by the other. It therefore results that the hand brake can never be caused to assist or supplement the action of the air brake, or vice versa, although in cases of partial failure of either, such assistance might be of very great value. For example, a train descending a long grade might, through a partial failure of the air brakes, attain a dangerous speed, and it would be impossible for those in charge of the hand brakes to attempt to check the velocity of the train until the air brakes had been released, when the substitution of the hand brakes for the air brakes would probably have been too long delayed to avoid an accident. Again, if it be necessary to uncouple an engine from its train, when standing upon a grade, the engineer must release the air-brakes, holding the train until the hand brakes are applied, and on returning to his train he must similarly hold it until the hand brakes are released. Should dependence be placed upon the air brakes, under similar circumstances, the air will, in time, leak off, and allow the train to run down the grade, unless the hand brakes are promptly applied. To further illustrate the defect referred to, a car may be side tracked on an incline, and left with the air brakes on, and the switchman may, through ignorance, set, as far as possible, the hand brakes, supposing that when the air leaks off, the hand brake would prevent the car from running down the grade, which would not be the case. Again, a car may be side tracked on a grade, with the brakes set by air pressure and the hand brakes set by the brakeman; as the air leaks from the brake cylinder, the brakes will release and allow the car to move, by reason of the fact that with the Hodge system, the application of the air and hand brakes is effected in contrary directions.

My improvement obviates danger of accidents from failure of air brakes and delays in operating trains on heavy grades, resultant upon the conditions of operations above referred to, and its construction and operation, as applied in regular service, will now be described.

Figure 2:
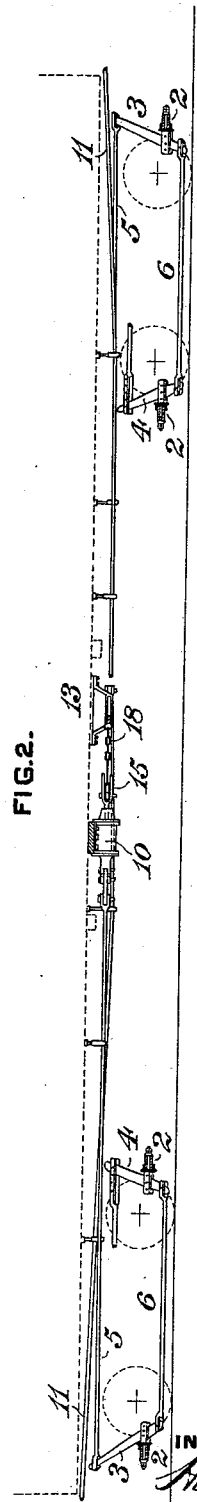
Figure 3:
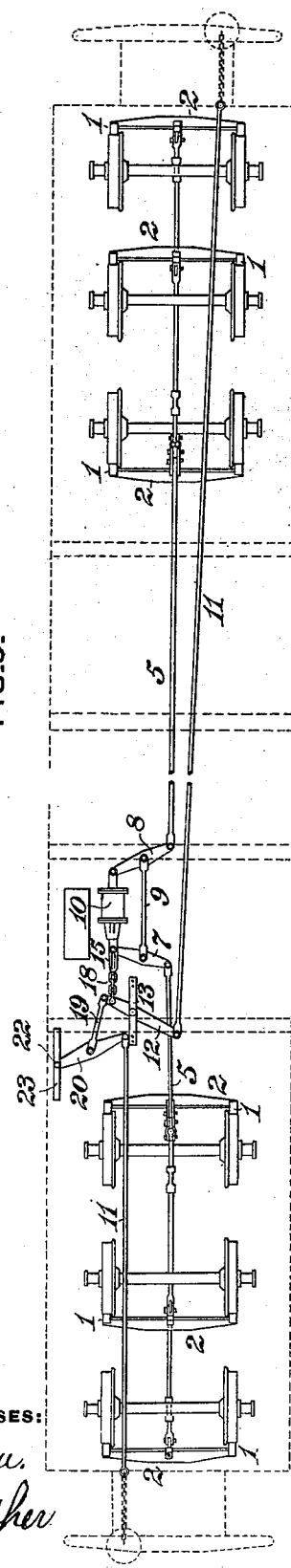
Figure 4:
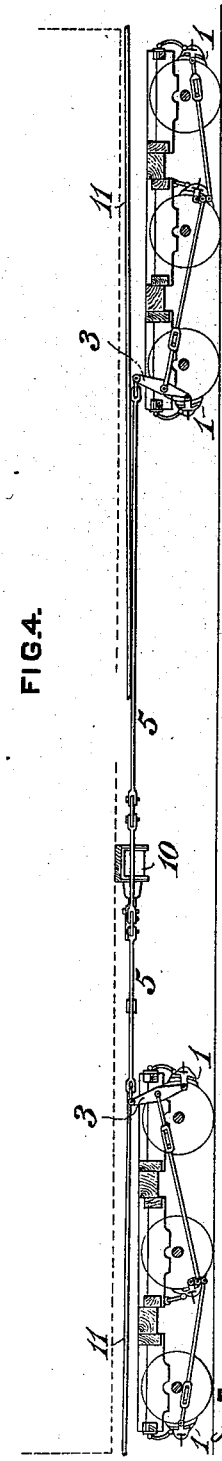

In the accompanying drawings: Figure 1 is a plan view of a brake apparatus for a passenger car, illustrating an embodiment of my invention; Fig. 2, a side view, in elevation, of the same; Fig. 3, a plan view illustrating a modification as applied in connection with a car having six wheeled trucks; Fig. 4, a side view, in elevation, of the same; Fig. 5, a plan view, on an enlarged scale, of the brake cylinder and brake cylinder lever connections shown in Figs. 1 and 2; Fig. 6, a similar view of said members as shown in Figs. 3 and 4; and, Fig. 7, a side view, partly in elevation and partly in section, of the brake cylinder, cross head and clevis.

In the practice of my invention as exemplified in Figs. 2, 2, 5 and 7, I provide a system of brake levers and connection which accords in its general features, with the well known Hodge system, which being familiar to those skilled in the art, need not be herein at length described. The structural differences between my improvement and prior constructions may be briefly stated as consisting in the elimination of the two floating levers heretofore employed for transmitting power from the brake shafts and brake cylinder to the truck levers; the substitution of a single pull rod, connecting the brake levers of each truck with the adjacent brake cylinder lever, for the two pull rods heretofore employed; and the provision of an independent hand brake lever, and a slotted cross head, clevis, and chain connection between the brake cylinder piston rod and the hand brake appliances.

The brake shoes 1 are fixed to brake beams 2, hung on the truck frames, and are applied to the wheels by live truck levers 3 and dead truck levers 4, pivoted to the brake beams and coupled, at their lower ends, one to the other, by pull rods 6. Power for effecting the application of the brakes, either by air pressure or by hand, is transmitted to the live truck levers 3, through pull rods 5, one for each truck, which are coupled, at their opposite ends to brake cylinder levers 7 and 8 respectively, and are also connected with hand brake connecting rods 11, to which hand power is applied, in the usual manner, through either or both of the brake shafts at the ends of the car. The brake cylinder levers 7, 8, are coupled by a connecting rod 9. The connection of the hand brake rods 11 with the truck brake levers 3, 4, and brake cylinder levers 7, 8, is such that draft for applying the brakes will be exerted upon the truck brake levers in the same direction by both the hand brake shafts and the brake cylinder levers, and the release of draft by either will be in the same direction as required for release of draft by the other. To this end, an independent double armed hand brake lever 12, is pivoted, at or near its center, by a pin 21, to a bracket or support 13, secured to the car frame, and is coupled at its ends to the hand brake connecting rods 11. The brake cylinder 10 is connected, in the usual manner, with the other elements of an air or other fluid pressure brake apparatus, of any suitable and preferred construction adapted to effect the application of the brakes by fluid pressure, which elements, not forming, in and of themselves, any part of my invention, and being familiar to those skilled in the art, are not shown. The piston rod 14, of the brake cylinder 10, is provided with a cross head 15, having longitudinally slotted jaws, in which a cross head pin 16 is fitted to slide freely. The brake cylinder lever 7 is coupled by the pin 16 to the cross head 15 and to a clevis 17, fitted to slide between the jaws of the cross head, and linked to one end of a flexible connection 18, preferably a chain, the opposite end of which is coupled to the independent hand brake lever 12, between its pivot 21 and one of its ends.

In making an application of the brakes by air pressure under the above, or a substantially similar, construction, the outward movement of the brake cylinder piston and its rod 14 upon the admission of air to the brake cylinder, moves the cross head 15 and its pin 16 in the same direction, and, through the resultant movement of the coupled brake cylinder levers 7 and 8, and their connections to the truck brake levers and brake shoes, applies the brakes, without the intervention, (as in the ordinary Hodge system) of floating or other auxiliary levers. During this operation, the independent hand brake lever 12 remains stationary, the chain 18 having become slack. If it be then desired to apply the hand brake, a few turns of either brake shaft will, acting through the adjacent brake shaft connecting rod 11, upon the independent hand brake lever 12, take up the slack of the chain 18, and hold the brakes upon both trucks of the car, in case the air should leak off or be released. In making a hand application of the brakes, when the air brake is released, the piston and piston rod 14 of the brake cylinder remain stationary, in position to be actuated for application of the brakes, upon the admission of air to the brake cylinder, and the cross head pin 16 moves, with the independent hand brake lever 12, in the slots of the jaws of the cross head, in accordance with the movement of the lever 12, to apply the brakes, due to draft upon either of the hand brake connecting rods 11. It will be seen that while the air and hand brakes act independently one of the other, both may be set at the same time if desired, one assisting or supplementing the other if needed, or acting in its stead in the event of its complete failure.

Figs. 3, 4 and 7 illustrate a modification of the above construction, as applied to cars having six wheeled trucks equipped with triple brakes, in which the brake cylinder is located at a greater distance from the longitudinal center line of the car than in the previous instance. To admit of ready application, with such location of the brake cylinder, an auxiliary brake lever 20 is pivoted at one of its ends, by a pin 22, to a bracket or support 23, and is coupled at its opposite end to one of the hand brake connecting rods 11. The other connecting rod 11 is coupled, as in the prior instance, to one end of the independent hand brake lever 12, and the opposite end of said lever is coupled, by a rod 19 to the auxiliary lever 20, between its pivot and its free end. It will be obvious that the operation is the same as in the instance first above described.

Among the advantages due to my improvement may be stated, generally, increased security in the operation of trains, particularly upon long and steep gradients, and, specifically, a decrease in the number of working parts required to operate the brakes; free and independent action of both air and hand brakes under all circumstances; the capability of setting both air and hand brakes at the same time, so that in the event of the failure of one, an efficient application of the brake may be made by the other; and the capability of setting the brakes on both trucks, from either end platform, by the turning of one brake wheel only.

I claim as my invention and desire to secure by Letters Patent—

1. The combination, in a railroad car brake, of a brake cylinder, a brake cylinder lever for actuating truck brake levers at both ends of a car by fluid pressure in said cylinder, a hand brake lever, and connections from the hand brake lever to the brake cylinder lever and to hand brake devices at each end of the car, whereby the hand brake lever may be operated from either end of the car to apply the brakes at both ends of the car, substantially as set forth.

2. The combination, in a railroad car brake, of a hand brake lever, hand brake devices at both ends of a car connected directly to said hand brake lever, a fluid pressure cylinder fitted with a piston and rod, a lever adapted to be actuated independently by either of the end hand brake devices or by the piston rod of the fluid pressure cylinder, and connections coupling said lever to the hand brake lever, substantially as set forth.

3. The combination, in a railroad car brake, of a system of truck brake levers for actuating connected brake shoes, a fluid pressure brake apparatus coupled thereto, a hand brake apparatus, and a flexible connection coupling the hand brake apparatus with a member of the fluid pressure brake apparatus having the capacity of independent movement relatively to the actuating piston rod thereof, substantially as set forth.

4. The combination, in a railroad car brake, of a system of truck brake levers for actuating connected brake shoes, a fluid pressure cylinder having a piston and rod, an intermediate connection coupled positively to one of said truck brake levers, and coupled to the piston rod with the capacity of independent movement, a hand brake connecting rod adapted to be actuated by manual power, and a flexible connection by which the hand brake connecting rod is coupled to the intermediate connection of the piston rod and truck brake lever, substantially as set forth.

5. The combination, in a railroad car brake, of two systems of truck brake levers, adapted to actuate connected brake shoes on trucks at opposite ends of a car, a fluid pressure cylinder having a piston and rod, an intermediate connection coupled positively to a lever of each of said systems, and coupled to the piston rod with the capacity of independent movement, two hand brake connecting rods coupled one to the other and adapted to be actuated by manual power applied at either end of the car, and a flexible connection by which the hand brake connecting rods are coupled to the intermediate connection of the piston rod and truck brake levers, substantially as set forth.

6. The combination, in a railroad car brake, of a brake shoe, a brake lever connected thereto, a fluid pressure cylinder fitted with a piston and rod, a brake cylinder lever coupled to said rod with the capacity of independent movement, and coupled positively to the lever of the brake shoe, a hand brake connecting rod, an independent hand brake lever coupled thereto, and a flexible connection coupling said independent hand brake lever to the brake cylinder lever, substantially as set forth.

7. The combination, in a railroad car brake, of a brake shoe, a brake lever connected thereto, a fluid pressure cylinder fitted with a piston and rod, a slotted cross head fixed to said rod, a brake cylinder lever coupled to the lever of the brake shoe, and traversing on the piston rod cross head, a hand brake connecting rod, an independent hand brake lever coupled thereto, and a flexible connection coupling said independent hand brake lever to the brake cylinder lever, substantially as set forth.

8. The combination, in a railroad car brake, of two systems of truck brake levers, adapted to acutate connected brake shoes on trucks at opposite ends of a car, a fluid pressure cylinder fitted with a piston and rod, a brake cylinder lever having a fixed fulcrum, and coupled to a brake lever of one of the trucks, a brake cylinder lever having a fulcrum which is movable on an extension of the piston rod, and coupled to a brake lever of the other truck, a rod coupling said brake cylinder levers one to the other, two hand brake connecting rods coupled one to the other and adapted to be actuated by manual power applied at either end of the car, and a flexible connection by which the hand brake connecting rods are coupled to one of the brake cylinder levers, substantially as set forth.

9. The combination, in a railroad car brake, of two systems of truck brake levers, adapted to actuate connected brake shoes on trucks at opposite ends of a car, a fluid pressure cylinder fitted with a piston and rod, an intermediate connection coupled positively to a lever of each of said systems and coupled to the piston rod with the capacity of independent movement, two hand brake connecting rods each adapted to be actuated by manual power applied at one end of the car, an independent hand brake lever coupled to one of said hand brake connecting rods, an auxiliary brake lever coupled to the other hand brake connecting rod and to the independent hand brake lever, and a flexible connection coupling the independent hand brake lever to the intermediate connection of the piston rod and truck brake levers, substantially as set forth.

HENRY J. SMALL.

Witnesses:
C. H. OATMAN,
A. M. SEYMOUR.